United States Patent [19]

Gordon, Jr. et al.

[11] 3,814,899

[45] June 4, 1974

[54] OVERTEMPERATURE CONTROL SYSTEM

[75] Inventors: Walter H. Gordon, Jr.; William D. Ryckman, Jr., both of Asheboro, N.C.

[73] Assignee: General Electric Company, Bridgeport, Conn.

[22] Filed: June 25, 1973

[21] Appl. No.: 373,365

Related U.S. Application Data

[63] Continuation-in-part of Ser. No. 316,414, Dec. 18, 1972.

[52] U.S. Cl.................. 219/212, 219/494, 219/504
[51] Int. Cl. ............................................. H05b 1/02
[58] Field of Search ............ 219/212, 494, 504, 505

[56] References Cited
UNITED STATES PATENTS

| | | | |
|---|---|---|---|
| 2,565,478 | 8/1951 | Crowley | 219/494 |
| 3,213,328 | 10/1965 | Ryckman, Jr. | 219/494 X |
| 3,396,265 | 8/1968 | Jacobson | 219/494 X |
| 3,418,454 | 12/1968 | Ryckman, Jr. | 219/494 X |
| 3,437,792 | 4/1969 | Lauck | 219/494 X |

*Primary Examiner*—Roy N. Envall, Jr.
*Attorney, Agent, or Firm*—George R. Powers; Leonard J. Platt; John F. Cullen

[57] ABSTRACT

A control system to limit the maximum temperature of an electrically heated bedcover in which a heater wire and a control wire separated by a layer of sensor material having a negative temperature coefficient of electrical impedance, all of which form a single cable distributed through the bedcover. The control system includes a series heating circuit including first and second contacts and the heater wire, a series control circuit including first and second actuators and the control wire, and a tie circuit including the layer of sensor material interconnecting the heating and control circuits in parallel with a selected one of the actuators. Phase shifting means is provided for assuring a potential difference between all adjacent portions of the heating and control wires when the heating and control circuits are energized from the same source of a-c power, and the actuators are operatively associated with the contacts such that the contacts are opened so as to cut off the supply of power to the heating wire whenever appreciable conduction occurs through the tie circuit as a result of an elevated operating temperature in the bedcover reducing the impedance of the layer of sensor material.

14 Claims, 7 Drawing Figures

3,814,899

OVERTEMPERATURE CONTROL SYSTEM

CROSS REFERENCE TO RELATED APPLICATION

This application is a continuation in part of copending patent application Ser. No. 316,414, for "Temperature Responsive Control System," filed on Dec. 18, 1972, in the names of Walter H. Gordon, Jr., and William D. Ryckman, Jr., and assigned to the assignee of this application.

BACKGROUND OF THE INVENTION

1. Field of the Invention

This invention relates to control systems for electrically heated bedcovers or the like in which heater and control conductors are contained in a single cable and, more particularly, to improved control systems which utilize a temperature sensor including between the heater and control wires a layer of sensor material having a negative temperature coefficient of electrical impedance.

2. Description of the Prior Art

A typical electrically heated bedcover includes a heating wire distributed in a serpentine fashion throughout the fabric of the bedcover. In addition, typical electrically heated bedcovers usually provide means for the user to regulate the heat output of the bedcover. Heat from the bedcover is used to minimize heat loss from the body of the user. At times, the normal heat output from the bedcover may be inadvertently obstructed, such as if a thermally insulating object is placed over a localized area of the surface, or if the bedcover is folded or bunched. In the event of such an obstruction, an above-normal temperature condition may occur in the sense that the temperature is considered excessive from a personal comfort standard. It, therefore, becomes necessary to provide a control system which will open the power circuit to the heating wire before the temperature reaches an excessive level.

In the design of an effective control system, several factors must be taken into consideration. As one consideration, it is desirable that the control system be failsafe in that should one of the elements in the control system become inoperative for one reason or another, the power circuit to the heating wire of the bedcover should be automatically opened. It is also desirable that the control system not be affected by fluctuations in line voltage in the power supply to the control system. It is also advantageous for the control system to have an automatic recycling feature so that in the event the cause of the above-normal temperature condition is corrected, heat output of the bedcover will once again be supplied in a normal manner. As an additional consideration, if the control system includes a relay which is actuated as a result of an above-normal temperature condition in the bedcover, it should not be affected by normal change in room ambient temperature.

A bedcover having the aforementioned control system features is described in U.S. Pat. No. 3,418,454 to W. D. Ryckman, Jr., assigned to the same assignee as the present invention. The Ryckman patent utilizes a separate sensor wire located alongside and in close proximity to the heater wire. It would be desirable from a manufacturing standpoint as well as providing an improved control system if the electric heater wire and the control wire were contained in a single combined heater-control cable. Preferably, the single cable would be made by having both the heater wire and sensor wire wound on a common core similar to the construction described in U.S. Pat. Nos. 2,581,212 to Spooner et al.; 2,565,478 to Crowley; and 2,846,560 to Jacoby et al., all assigned to the same assignee as the present invention. In this manner, it would be assured that the control wire would be in intimate relationship with the heater wire at all points along the heater wire. Such a heater-control cable should also provide a control system for a bedcover that has all of the control system desirable features mentioned in the previous paragraph.

By this invention, an improved control system for bedcovers utilizing a combined heater wire-control wire cable is provided which incorporates all of the desirable features mentioned above.

SUMMARY OF THE INVENTION

It is an object of this invention to provide an improved overtemperature control system for bedcovers having heater and control wires combined in a single cable.

Another object of this invention is to provide an improved overtemperature control system providing the desirable features set forth above in a bedcover or the like in which heater and control wires are combined in a single cable.

Yet another object is to provide an improved overtemperature control system for a bedcover in which heater and control wires are combined in a single cable with a layer of sensor material having a negative temperature coefficient of electrical impedance between the heater and control wires.

In accordance with this invention, there is provided a control system to limit the maximum temperature of an electrically heated bedcover or the like of the type including an electric heater wire and control wire distributed through the bedcover with the heater wire and the control wire contained in a single cable, preferably by having both wound on a common core. The heater and control wires are separated by a sensor material having a high electrical impedance at normal operating temperatures and a low electrical impedance at elevated above-normal temperatures, referred to herein as a sensor material having a negative temperature coefficient of electrical impedance. The control system includes first and second contacts and respective first and second electrical actuators to selectively open and close the contacts. The heater wire and the first and second contacts are connected in series to form a heating circuit, and the control wire and the first and second actuators are connected in series to form a control circuit. A tie circuit interconnects the heating and control circuits in parallel with a selected one of the actuators, the tie circuit including the layer of sensor material. The control system further includes phase shifting means for assuring a potential difference across the layer of sensor material at all points along the cable such that substantial current will be shunted away from the selected actuator through the tie circuit when an over-temperature condition is present. The first and second actuators are operative to open the contacts whenever current is shunted away from the selected actuator, thereby preventing further heating of the heater wire. Upon cooling of the layer of sensor material, the tie circuit no longer conducts an appreciable amount of current, and the actuators close the contacts to permit further heating of the heater wire.

By further aspects of the invention, the first and second contacts are respectively mounted on first and second thermally responsive movable elements, and the first and second actuators are heaters in intimate heat transfer association with the movable elements. The heaters preferably have different resistance values such that the movable elements are unequally heated when the bedcover is operating at normal operating temperatures. By a still further aspect of the invention, the control circuit includes a transformer having primary and secondary circuits, and the phase shifting means is operatively coupled with the transformer.

BRIEF DESCRIPTION OF THE DRAWING

While the novel features of this invention are set forth with particularity in the appended claims, the invention, both as to organization and content, will be better understood and appreciated, along with other objects and features thereof, from the following detailed description taken in connection with the drawing, in which:

DETAILED DESCRIPTION

Figure 1:
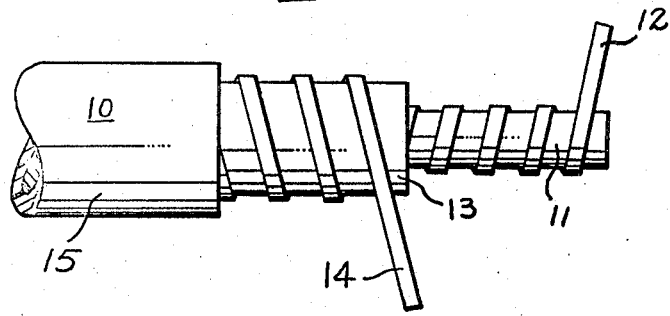
FIG. 1 is an enlarged view, partly cut away, showing a combined heater wire and control wire cable suitable for use in the present invention.

Referring now to the drawings in detail, FIG. 1 illustrates the construction of a combined heater wire-control wire cable 10 having an insulating central core 11, which may be formed of fiber glass or other suitable insulating flexible material. Around the central core 11 is a helically wound and electrically conductive heating wire 12. A layer of sensor material 13 having a negative temperature coefficient of electrical impedance is extruded or otherwise applied over the central core 11 and the heating conductor 12. The layer of sensor material 13 has a generally cylindrical cross sectional configuration with its wall thickness substantially uniform throughout the length of cable 10. Examples of some sensor materials for use in electric blankets are described in the Ryckman, Crowley, Spooner et al. and Jacoby et al. patents previously mentioned in the background of the Invention section. It should be noted that any suitable sensor material which exhibits the characteristics of having a high electrical impedance at normal operating temperatures and a low impedance at above-normal temperatures and accomplishes the desired results would be suitable. Specifically, we have found that the sensor material described in Jacoby et al. U.S. Pat. No. 2,846,560 is preferred.

Helically wound around the outside of sensor material 13 is an electrically conductive control wire 14. An outer electrically insulating layer 15, such as polyvinyl chloride, is applied over the control wire 14 and the outer surface of the sensor material. It should be noted that constructions other than the concentric, spiraled, or helically wound conductors 12 and 14 may be used. It is only essential to use two conductors in contact with and separated by a relatively thin layer of sensor material having a negative coefficient of electrical impedance. The combined heater wire-control wire cable 10 shown in FIG. 1 and described above may be distributed through the bedcover in a conventional serpentine pattern.

Figure 2:
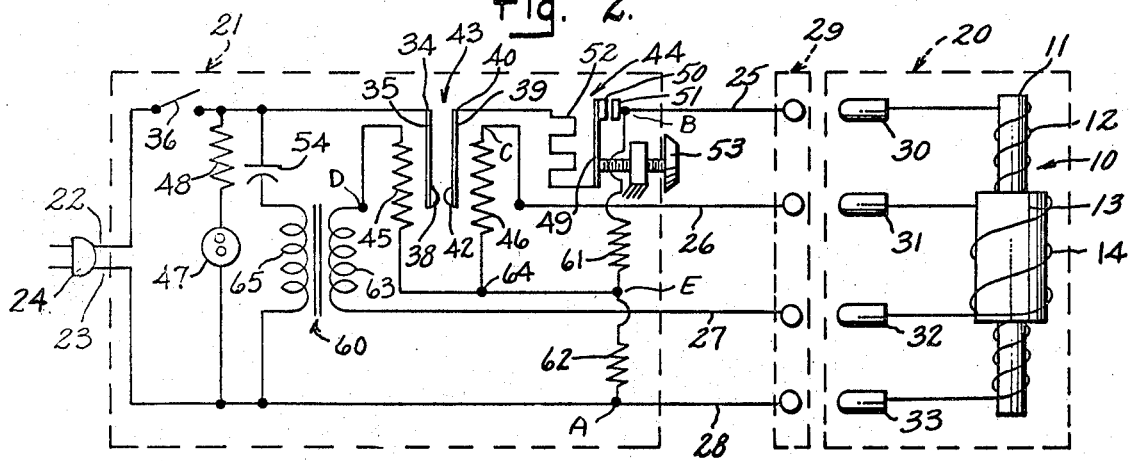
FIG. 2 is a circuit diagram of one form of the heating and control circuits of the control system of this invention.

With reference now to the circuit diagram of FIG. 2, numeral 20 indicates a blanket within the dotted lines, and numeral 21 indicates a control box also within dotted lines. Power leads 22 and 23 extend from the control box to a conventional power plug 24 to be inserted into an ordinary alternating current household outlet. In order to connect the control box to the blanket, conductor leads 25 through 28 extend from the control box to appropriate receptacles in a female connector plug 29. The blanket carries male plug prongs 30 through 33 which are received in respective receptacles in the female connector plug. To supply heat to the bedcover, the heater wire 12 is connected between plug prongs 30 and 33. The control wire 14 is connected between plug prongs 31 and 32.

Although it forms no part of the present invention, the control system for the blanket 20 includes an ambient responsive control 44 housed in the control box 21, the ambient responsive control 44 including a bimetallic blade 49 which carries a contact 50 adapted to engage a fixed contact 51. The bimetallic blade is of such a character as to move the contact 50 away from the contact 51 under the influence of heat. A heating resistor 52 is connected in electrical series in the line with the bimetallic blade 49 and the heater wire 12, the resistor 52 being in thermal transfer relationship with the blade 49. The blade is influenced both by heat generated by resistor 52 and by changes in the ambient temperature. Assuming that the bedroom is cold, the contacts 50 and 51 will be engaging each other. Now, if the rest of the circuit, including the over-temperature contacts 38 and 42, is closed, current will flow through the contacts 50 and 51 and also through the resistor 52. The resistor 52 will warm the blade 49 until it deflects moving the contacts 50 and 51 out of engagement with each other. The length of time that it takes to warm the blade sufficiently to deflect will depend upon the ambient temperature surrounding the blade. Once the contacts 50 and 51 are open, the heater and blade will cool, thereby causing the contacts to once again close, and the cycle will repeat itself. An adjustment knob 53 is operatively associated with the bimetal to permit the user to exercise control over the temperature at which the contacts open, and thereby regulate the heat output of the blanket. Thus, the main heater or heating circuit for the blanket may be traced from power line 22, manual switch 36, a recycling relay 43 including the contacts 38 and 42 (presently to be described in connection with the present invention), ambient responsive control 44, to heater wire 12 and thence to the other power line 23. At this point, it may be noted that the heating circuit includes the heater wire 12 and the contacts 38 and 42 connected in series and that the heating circuit may be energized through insertion of the power plug 24 into an ordinary alternating current household outlet.

A pilot lamp 47 is connected between lines 22 and 23 and is energized at all times when manual line switch 36 is closed. A current limiting resistor 48 is in electrical series with the pilot lamp.

Figure 5:
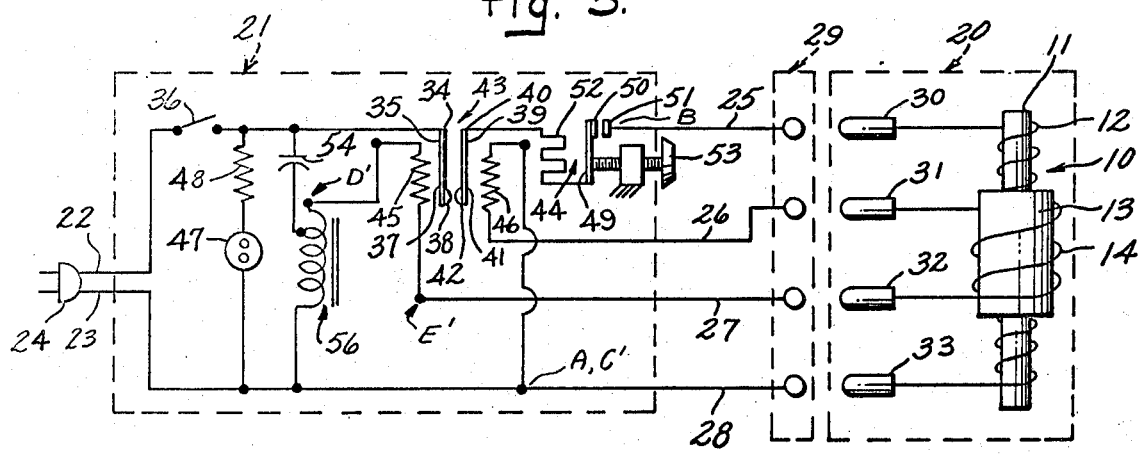
FIG. 5 is a circuit diagram showing an alternate arrangement of the heating and control circuits of this invention.

The recycling relay 43 will now be described. As shown in FIG. 2, power lead 22 is connected to a fixed end 34 of a first bimetallic blade 35 via manual switch 36. The blade 35 has a deflectable end which carries the contact 38. A second bimetallic blade 39 has one end 40 secured to the control box, and the other end is deflectable and carries the contact 42. The bimetallic blades 35 and 39 are so arranged as to have the contacts 38 and 42 normally open or disengaged, and they both deflect in the same direction under the influence of heat. This would be to the left as shown in FIG. 2 and 5. Preferably, the bimetallic blades are made substantially identical to each other so that any normal changes in room ambient temperature surrounding the blades in the control box will affect the deflection of each of the blades in substantially the same manner and the relative positions of the contacts 38 and 42 will not be changed. The bimetallic blades are thermally responsive elements and function to move the contacts 38 and 42 into and out of engagement with each other depending upon certain operating conditions of the entire system as will be hereinafter described in more detail. The fixed end of the bimetallic blade 40 is connected to conductor lead 25 through ambient responsive control 44, thus providing the main power or heating circuit for the blanket heater as previously described.

In order to supply heat to the bimetallic blade 35, a first control heater 45 in the form of a resistance element is positioned in intimate heat transfer relation with the blade. To supply heat to the bimetallic blade 39, a second control heater 46 is positioned in intimate heat transfer relation with this latter blade. The resistance of control heater 46 is greater than the resistance of control heater 45. For example, in a practical embodiment heater 45 was 10,000 ohms while heater 46 was 18,000 ohms. It should be noted that the control heaters are in electrical series with each other in a control circuit commencing with the upper terminal of the secondary winding 63 of a low power transformer 60 through heaters 45 and 46 and the control wire 14 in the blanket 20 to the lower terminal of the secondary winding 63 of transformer 60.

The control circuit is energized through the plug 24 from the same source of a-c power as the heating circuit, but the voltage applied across the series connection of the heaters 45 and 46, and the control wire 14 differs substantially in phase from that supplied to the heater wire 12. As illustrated by FIG. 2, the required phase shifting is accomplished by connecting the primary winding 65 of the lower power transformer 60 in series with a phase shift capacitor 54 across the power line, the secondary winding 63 providing phase shifted electric power for control purposes. The capacitor 54, or other phase shifting device or means, is provided between the power lead 22 and the primary winding 65 of transformer 60 so that upon energization of the heater wire 12 and control wire 14 there is provided at all points along the combined heater wire-control wire cable 10 a potential difference between the heater wire 12 and the control wire 14. Ideally, the capacitor 54 is chosen so that the voltage on transformer secondary 63 will be shifted in phase substantially, for example 60°, from the phase of the line voltage. A capacitance value of 0.3 to 0.4 microfarads has been found adequate when used with a 1:1 ratio audio-type transformer. The capacitor used should be the self-healing type, so that should a short occur in the capacitor with voltage applied, the short will clear itself. One such type of capacitor is a metallized film capacitor, having a thin metallic coating applied to a plastic filmtype dielectric. Alternatively, capacitor 54 can be placed in the secondary circuit of transformer 60, if desired.

Still referring to FIG. 2, there is provided in accordance with the invention a tie circuit in parallel with the heater 46, the tie circuit interconnecting the control and heating circuits. More particularly, it will be noted that voltage dividing resistor 61 and the layer of sensor material 13 provide a circuit from junction 64 of the control circuit to the heater wire 12 of the heating circuit and then back to the junction C of the control circuit. Since the junctions 64 and C are on opposite sides of the heater 46, it will be appreciated that the tie circuit is in parallel with the heater 46. At normal operating temperatures, the resistance of the sensor material is sufficiently high to substantially prevent flow of current through the tie circuit. At elevated temperatures, however, the resistance of the sensor material drops sufficiently to permit substantial current to be shunted around the heater 46 through the tie circuit. Similarly, it will be noted that there is a tie circuit between junctions 64 and C through the voltage dividing resistor 62 and the layer of sensor material 13.

Assuming the male plug prongs 30 through 33 are plugged into their respective female receptacles in the connector plug 29 and assuming the power plug 24 is plugged into an alternating current household outlet, the control system of FIG. 2 will operate in the following manner. When switch 36 is closed, current flows in a path through capacitor 54 to the primary winding 65 of transformer 60 then to the other side 23 of the power source. Current is induced to flow in the secondary winding 63 of the transformer. Assuming there is no above-normal temperature condition, the layer of sensor material 13 is essentially an insulator; therefore, current flows through the series control circuit including the secondary winding 63, the control wire 14, and and the heaters 45 and 46. The heater 46 supplies more heat to bimetal 39 than heater 45 supplies to bimetal 35 because heater 46 has a higher electrical resistance; therefore, blade 39 will be deflected a greater distance than blade 35. The gap between the blades is so calibrated during manufacture with respect to the deflection properties of the blades that this greater deflection causes contact 42 to engage contact 38 and thus close the thermally responsive actuator 43. With actuator 43 closed, the circuit including the heater wire 12 is now completed, and it will function to heat the bedcover in the manner previously described as long as an above-normal temperature condition does not exist.

Figure 3:
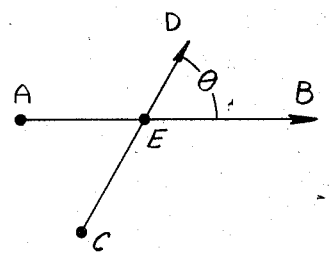
FIG. 3 is a vector diagram of the voltages of the control system of FIG. 2 when operating under normal temperature condition.

With reference to the vector diagram of FIG. 3, the electrical theory of the control system of FIG. 2 operating under normal temperature conditions will be described. When manual switch 36 is closed, capacitor 54 and primary winding 65 of transformer 60 are connected in series across the a-c line voltage. In FIG. 3, the phase shift induced by the capacitor 54 is designated $\theta$ and is approximately 60°. Obviously, capacitor 54 can be in either the transformer primary or transformer secondary circuit with essentially the same effect. Vector $\overline{AB}$ represents the line voltage from male plug prong 33 to plug prong 30 and thus the voltage across the heating conductor 12. The portion $\overline{AE}$ will be the voltage across resistor 62 and portion $\overline{EB}$ the voltage across resistor 61. Thus, junction 64 may be said to be at voltage E. Vector $\overline{CD}$ represents the phase shifted voltage from the transformer secondary 63. Portion $\overline{ED}$ is the voltage on heater 45 and portion $\overline{CE}$ is the voltage on heater 46. There is now more voltage across control heater 46 than control heater 45 since its resistance is substantially greater than that of heater 45 and since the current through both control heaters 45 and 46 is essentially the same. Consequently, more power is going to control heater 46 so the thermally responsive actuator 43 closes and remains closed to permit the heater wire to continue to be energized. In accordance with this invention, the control voltage is shifted in phase with respect to the bedcover heater voltage with a common tie point or junction 64, thereby establishing point E common to both heater and control voltage on the vector diagram.

Now, assuming that an above-normal temperature condition exists, the layer of sensor material 13 becomes a conductor of significant current between the heater wire 12 and the control wire 14. In other words, the heater 46, which has the higher resistance is now shunted by a parallel tie circuit including the resistors 61 and 62 and the sensor layer 13. Electrical current through control heater 46 is thus substantially decreased relative to the current supplied to control heater 45. This causes bimetal blades 35 and 39 to move away from each other, thereby breaking electric contact and opening actuator 43 so as to interrupt the current to the blanket heater wire 12. Now, as the bedcover cools, the electrical impedance of the layer of sensor material 13 increases to a point where the tie circuit ceases to conduct appreciable current. The blade 39 will then deflect more than the blade 35, and the contacts 38 and 42 will be re-engaged. If, however, the reason for the above-normal temperature condition still exists, an above-normal temperature condition will soon occur again, and the layer of sensor material will once again become conductive. As a result, the contacts 38 and 42 will again open to interrupt flow of electric current to the heater wire 12. The system will continue to recycle in this manner until the cause of the above-normal temperature condition is corrected.

Figure 4:
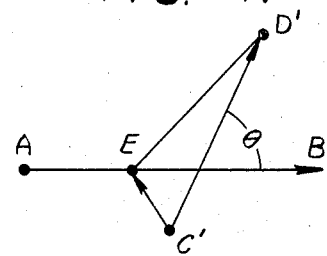
FIG. 4 is a vector diagram of the voltages of the control system of FIG. 2 when operating under an elevated or overtemperature condition.

With reference to the vector diagram of FIG. 4, the control system operates under above-normal temperature conditions in the following manner. Assuming a portion of the cable 10, about one-quarter of its length from male plug 30 becomes overheated, this will have the effect of connecting a resistance from the control wire 14 to the heating conductor 12 at the point of overheat. This will cause point C on the vector diagram to be displaced towards a point somewhere between E and B. This new point C location is designated $C^1$ in FIG. 4. $\overline{C^1D^1}$ will remain the same magnitude as $\overline{CD}$ of FIG. 3 and have the same phase angle, and voltages $\overline{AE}$ and $\overline{EB}$ will remain substantially unchanged. The voltage portion $\overline{ED^1}$ is now substantially greater than $\overline{C^1E}$. The power to control heater 45 will be equal to or greater than that to control heater 46, and the thermally responsive actuator will open and remain open until the overheated portion of the bedcover cools down.

It will be appreciated that this control system is fail-safe in the sense that should an open circuit occur in any of the elements including the capacitor 54, control heaters 45 and 46, the conductors 26 and 27 or the control wire 14, there will be no power to either of the control heaters 45 and 46 and the contacts 38 and 42 will open.

Instantaneous fluctuations in line voltage, such as may occur in house current occasionally, across the power leads 22 and 23 will not affect the operation of contacts 38 and 42 because control heaters 45 and 46 do not lose heat instantaneously, and normal voltage will most probably be returned before the control heaters are influenced to any degree. Furthermore, the operation of the thermally responsive actuator tends to accommodate itself to voltage fluctuations that remain on the line over an indefinite period of time. The reason for this accommodation is that if the voltage across control heater 45 is reduced, the current will be less through the control heater and blade 35 will tend to return to normal position. This reduction in voltage, however, also reduces the current through control heater 46 and blade 39 will thereby tend to follow blade 35. In this manner, the actuator automatically accommodates itself to reduction or increase in line voltage up to a certain degree. It will be understood from the above description that operation of the actuator 43 is predicated on the basis of a difference in the amount of heat supplied to the respective bimetal blades 35 and 39. The actuator is calibrated so that the contacts will be open when the same amount of heat is supplied to each blade. Then, if more heat is supplied to blade 39 than to blade 35, the contacts are closed and the contacts will remain closed as long as the heating conditions continue as such. On the other hand, as blade 35 receives more heat and blade 39 receives less heat in an above-normal temperature condition, the contacts will open. In order to supply more heat to blade 39 than blade 35 in normal operation of the bedcover and thereby hold the contacts closed, we have chosen to use a greater resistance value for control heater 46 than control heater 45. It is possible, however, that means other than a large resistance may be used to increase this ratio in normal operation of the bedcover. In regard to this latter point, the difference in heat sensed by the actuator may be increased by utilizing a better thermal transfer between the heater 46 and the blade 39 than might be used between the heater 45 and the blade 35. In summary, the two bimetals deflect the same direction responsive to heat. The switch actuated by the bimetals is open when the bimetal blades are at essentially the same temperatures; and closed where the bimetals are heated differentially, provided the bimetal with the larger or more effective heater is oriented with its heat responsive motion toward the other bimetal.

FIG. 5 illustrates a control system utilizing an alternative embodiment of this invention, and like numerals are used to indicate like parts corresponding to the control system of FIG. 2, the heating circuit being substantially identical to that of FIG. 2. In this embodiment, a step-up auto-transformer 56 has been substituted for the transformer 60 shown in FIG. 2. The voltage from the auto-transformer is applied to a series control circuit including heaters 45 and 46 and the control wire 14 via plug prongs 31 and 32. The heater 46 is parallel by a tie circuit interconnecting the heating and control circuits by the layer of sensor material 13. Thus, current can be shunted around the resistor 46 by flowing through the layer of sensor material between the heating wire 12 and the control wire when the layer of sensor material reaches a temperature at which appreciable current can flow through it.

In the embodiment of FIG. 5, control heater 45, heats bimetallic blade 35, and control heater 46 heats bimetallic blade 39, both of which move their respective contacts 38 and 42 to the left when heated as previously described in connection with FIG. 2. Again, control heater 46 has a greater resistance than control heater 45 so with essentially the same current flowing in both, control heater 46 will generate more heat causing bimetal 39 to move a greater distance to the left than bimetal 35, thus causing the contacts 38 and 42 to close. When both bimetals are cold or at the same temperature, the contacts are open. When the bedcover is at normal temperatures, resistance of the layer of sensor material 13 is high enough so that the contacts 38 and 42 remain closed. If any part of the heater wire-control wire cable 10 becomes overheated, appreciable current is shunted away from control heater 46 through the layer 13 and relatively more current flows in control heater 45. This causes bimetal blade 35 to be displaced to the left more than bimetal blade 39 and the contacts 38 and 42 to open, thereby removing power from heating wire 12. When the overheated area cools down, the contacts 38 and 42 will close again to restore normal operation.

Figure 6:
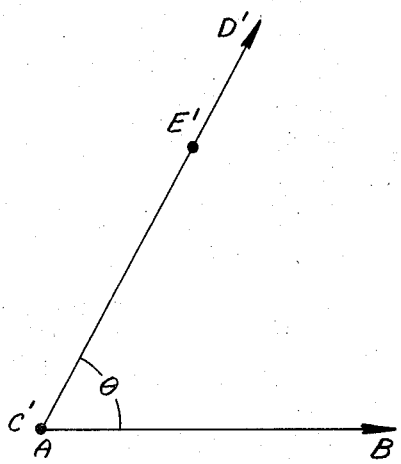
FIG. 6 is a vector diagram of the voltages of the control system of FIG. 5 when operating under normal temperature conditions.

With reference to the vector diagram of FIG. 6, the electrical theory of the control system of FIG. 5 operating under normal temperature conditions will be described. When manual switch 36 is closed, capacitor 54 and the winding of the step-up auto-transformer 56 are connected in series across the a-c line voltage. In FIG. 6, the phase shift induced by the capacitor 54 is designated $\theta$ and is approximately 60°. Obviously, capacitor 54 can be in either the transformer primary or transformer secondary circuit with essentially the same effect. Vector $\overline{AB}$ represents the line voltage from male plug prong 33 to plug prong 30 and thus the voltage across the heating conductor 12. Vector $\overline{C^1D^1}$ represents the phase shifted stepped up voltage from the secondary circuit of the auto-transformer 56. Portion $\overline{C^1E^1}$ is the voltage on heater 46 and portion $\overline{E^1D^1}$ is the voltage on heater 45. There is now more voltage across control heater 46 than control heater 45 since its resistance is substantially greater than that of heater 45 and since the current through both control heaters 45 and 46 is essentially the same. Consequently, more power is going to control heater 46 so the contacts 38 and 42 of the thermally responsive actuator 43 close and remain closed to permit the heater wire to continue to be energized.

Figure 7:
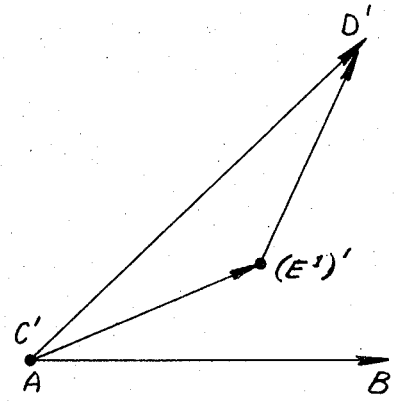
FIG. 7 is a vector diagram of the voltages of the control system of FIG. 5 when operating under an elevated or overtemperature condition.

With reference to the vector diagrams of FIG. 6 and 7, the control system operates under above-normal temperature conditions in the following manner. Assuming the portion of the heating wire 12 at a voltage about one-quarter of way from voltage B to voltage A becomes overheated, this will have the effect of connecting a resistance from the control wire 14 to the heating conductor 12 through the layer 13 at the point of overheat. This will cause point $E^1$ on the vector diagram of FIG. 6 to be displaced to a new point $(E^1)^1$ toward $\overline{AB}$ as illustrated by FIG. 7. As a result, the new voltage $\overline{C^1(E^1)^1}$ on the heater 46 is substantially less than the previous voltage $\overline{C^1E^1}$, and the current through the heater 46 drops significantly since a portion of the total current through the heater 45 is now shunted around the heater 46 through the layer 13. Consequently, even though control heater 45 has a lower resistance than control heater 46, the power to control heater 45 will be equal to or greater than that to control heater 46 and the contacts 38 and 42 will open and remain open until the over-heated portion of the bedcover cools down.

As indicated by the illustrative circuits of FIGS. 2 and 5, the control system of this invention, using a common heater and temperature sensitive control cable, requires a control voltage different from the main heater voltage. Such a control voltage can be derived from the power supply by a transformer, an auto-transformer, or by a series resonant circuit with capacitor and reactor. A reactive component, such as a capacitor or an inductance, in the control circuit offers the advantage of a phase shift between control voltage and main heater voltage, thereby to assure a voltage difference at all times across the temperature sensitive layer. There must be one common circuit connection or tie circuit between the control circuit and the heating circuit arranged to provide with the temperature sensitive layer between the bedcover heater and control wires a parallel circuit with the control heater having the larger resistance. Furthermore, although heaters 45 and 46 and associated bimetallic blades 35 and 39 have been described in connection with preferred embodiments of the invention, it will occur to those skilled in the art that other electrical actuators could be used in accordance with the invention to move contacts 38 and 42 into and out of engagement with each other.

While there has been shown and described particular embodiments of the present invention, it will be apparent to those skilled in the art that other various changes and modifications may be made without departing from the invention in its broader aspects, and it is, therefore, contemplated in the appended claims to cover all such changes and modifications that fall within the true spirit and scope of the present invention.

What is claimed as new and is desired to secure by letters Patent of the United States is:

1. In a control system to limit the maximum temperature of an electrically heated bedcover or the like of the type including an electric heater wire and a control wire contained in a single cable distributed through the bedcover with the wires separated by a layer of sensor material having a negative temperature coefficient of electrical impedance such that the layer of sensor material is essentially an insulator at normal operating temperatures and a conductor of significant current at elevated temperatures, the improvement comprising:
   a. first and second contacts,
   b. first and second electrical actuators operatively associated with said first and second contacts, respectively, to selectively close and open said first and second contacts,
   c. a series heating circuit including the heater wire and said first and second contacts, d. a series control circuit including said first and second actuators and the control wire,
e. a tie circuit interconnecting said heating and control circuits in parallel with a selected one of said first and said actuators, said tie circuit including the layer of sensor material,
f. phase shifting means operative on at least one of said heating and control circuits to provide at all points along the heater and control cable a potential difference between the heater and control wires when both said heating and control circuits are energized from the same a-c power source, whereby substantial current will be shunted away from the selected actuator through said tie circuit when a portion of the layer of sensor material is subjected to an elevated temperature,
g. said first and second actuators being operative to close said first and second contacts when said control circuit is energized and there is no appreciable conduction through said tie circuit and the layer of sensor material at normal operating temperatures, to open said first and second contacts when said heating and control circuits are energized and there is appreciable conduction through said tie circuit and the layer of sensor material at elevated temperatures, and to open said first and second contacts when said control circuit is not energized for an appreciable length of time.

2. The control system improvement of claim 1 in which said first and second contacts are mounted, respectively, on first and second thermally responsive movable elements and in which said first and second actuators are heaters in intimate heat transfer association with said first and second elements, respectively.

3. The control system improvement of claim 2 in which said first and second actuators are heaters having different resistance values such that said first and second movable elements are unequally heated when the bedcover is operating at normal operating temperatures with no appreciable conduction through said tie circuit and the layer of sensor material.

4. The control system improvement of claim 3 in which said selected one of said first and second actuators has the higher resistance value.

5. The control system improvement of claim 1 in which the control circuit includes a transformer having primary and secondary circuits.

6. The control system improvement of claim 5 in which said phase shifting means is in the primary circuit of said transformer.

7. The control system improvement of claim 6 in which said phase shifting means is a capacitor.

8. The control system improvement of claim 7 in which said primary and secondary circuits comprise separate primary and secondary windings, said capacitor and said primary winding connected in series for energization by the same a-c source as said heating circuit and said secondary winding connected in series with said first and second actuators and the control wire.

9. The control system improvement of claim 7 in which said primary and secondary circuits comprise a single winding, said capacitor and a portion of said winding connected in series for energization by the same a-c source as said heating element and said winding connected in series with said first and second actuators and the control wire.

10. The control system improvement of claim 7 in which said first and second contacts are mounted, respectively, on first and second thermally responsive movable elements and in which said first and second actuators are heaters in intimate heat transfer association with said first and second elements, respectively.

11. The control system improvement of claim 10 in which said first and second actuators are heaters having different resistance values such that said first and second movable elements are unequally heated when the bedcover is operating at normal operating temperatures with no appreciable conduction through said tie circuits and the layer of sensor material.

12. The control system improvement of claim 11 in which said selected one of said first and second actuators has the higher resistance value.

13. The control system improvement of claim 12 in which said primary and secondary circuits comprise separate primary and secondary windings, said capacitor and said primary winding connected in series for energization by the same a-c source as said heating circuit and said secondary winding connected in series with said first and second actuators and the control wire.

14. The control system improvement of claim 12 in which said primary and secondary circuits comprise a single winding, said capacitor and a portion of said winding connected in series for energization by the same a-c source as said heating circuit and said winding connected in series with said first and second actuators and the control wire.

* * * * *